United States Patent Office 3,172,795
Patented Mar. 9, 1965

3,172,795
EXOTHERMIC REFRACTORY MATERIALS CONTAINING OXIDIZING AGENTS AND PROCESS
Derek Priestley Helliwell, Clifford Hall, and George Snow, all of Birmingham, England, assignors, by mesne assignments, to Foseco International Ltd., Nechells, Birmingham, England, a British company
No Drawing. Filed Jan. 25, 1962, Ser. No. 168,793
Claims priority, application Great Britain, Jan. 27, 1961, 3,284/61
8 Claims. (Cl. 149—40)

This invention relates to refractory materials and their production and use.

It is known that for heavy duty in the metal melting and casting industry, refractories containing a high proportion of alumina are preferred for some applications. These materials are generally obtained by firing, e.g. in an oven or kiln, an aluminous clay of high alumina content and generally speaking the higher the alumina content, the higher is the firing temperature required. Only by such high firing tempeartures are products of satisfactory density and resistance to erosion by molten metal obtained. Such firing operations may take several days to complete and they involve a considerable expenditure in fuel.

Further, it is to be noted that it is frequently required to form a refractory material in situ, e.g. as a lining in a ladle, nozzle, cupola spout, launder or in parts of furnaces. Taking the lining of a ladle as typical, the method consists in lining the ladle with aluminous clay by trowelling, or with clay bricks with a sealing clay then applied as a mortar. The lining is then fired by means of burners located in the ladle so as to dry out the clay and reduce it to suitable refractory condition. In this treatment, however, the burners tend to drive the moisture towards the ladle walls and it is, therefore, difficult, expensive and time-consuming to effect complete drying of the lining.

It is an object of the present invention to provide a new process for the production of refractories, and especially refractories of high alumina content, which avoids the disadvantages referred to above, provides a refractory of low porosity (a porosity of at most 50% and preferably 30–35%) and which presents additional advantages.

According to a first feature of the present invention there is provided a process for the production of a refractory material which comprises forming an admixture of a refractory which is alumina or an aluminous clay, at least 10% by weight of the admixture of aluminum in a state of subdivision such that it will pass a 60 mesh and a substantial proportion of it will pass a 200 mesh, and a quantity of oxidizing agent for the aluminum which is substantially less than the amount stoichiometrically necessary to oxidize all the aluminum, the refractory being of such particle size that it will pack to a condition of low porosity, the said admixture being bonded with the minimum amount of bonding agent sufficient to impart shape-retaining properties to the shaped admixture, and subjecting said bonded mixture to a temperature at which reaction between the aluminum and the oxidizing agent is initiated and thereafter proceeds exothermically, the character and quantity of the exothermically reacting ingredients being such as to cause the mixture to increase in temperature to at least 1400° C.

In the oxidation reaction the aluminum is converted to about twice its weight of alumina, thus increasing the alumina content of the product, while the heat generated dries out and fires the whole composition, leaving as the product a fired high alumina-refractory composition. Thus no baking operation is necessary, and the products may be described as self-fired refractories.

Generally the mixture will be bonded by means of an aqueous bonding agent such as aqueous gum arabic or sulphite lye and will be partially dried out before it is fired to initiate the exothermic reaction. As noted above the minimum possible amount of bonding agent should be employed as such materials burn away completely, increasing the porosity of the fired shape.

The invention further includes the compositions of alumina, or aluminous clay, aluminum and oxidizing agent, used for the production of refractories by the foregoing method, and also the refractories so obtained.

Where an aluminous clay is employed, it is preferably one which itself has a high alumina content in the form of complex aluminum silicates, e.g. an $Al_2O_3$ content of 50% by weight or even more. Preferably the clay should have a coefficient of expansion which is less than 4%. Suitable aluminous clays are molochite, chamotte and sillimanite. The refractory should be of such particle size that it readily packs to a dense condition. In this respect it is found that a particle distribution in which about 45% will pass a 5 mesh but be retained on a 30 mesh, about 10% will pass a 30 mesh and be retained on an 80 mesh and about 45% will pass an 80 mesh, is very suitable. Mixtures of different aluminous clays may, of course, be employed.

As noted above the aluminum should be in the form of a powder of which the particles will pass a 60 mesh and of which a substantial proportion will pass a 200 mesh. Aluminum in the form of ball mill dust (which itself contains a substantial amount of alumina) is very suitable and is a relatively very cheap starting material.

The oxidizing agent is preferably a strong oxidizing salt such as nitrate or chlorate. It is preferred that the metal oxide produced therefrom should not be one of low melting point and for this reason barium nitrate, which yields barium oxide, is particularly suitable. The quantity of oxidizing agent will generally be less than 50% of the amount stoichiometrically equivalent to the aluminum, and is preferably less than 25% of such equivalent. The compositions may contain iron oxide or manganese oxide as additional oxidizing agents, but only in low proportions, e.g. 2 to 5%.

Advantageously, the composition may contain a small proportion, e.g. 0.1 to 10% by weight, of a fluoride. Suitable fluorides are aluminum fluoride, the alkali metal fluorides such as sodium, potassium and lithium fluorides, sodium aluminum fluoride, potassium aluminum fluoride or a complex silicofluoride, borofluoride or titanofluoride. The fluoride tends to decrease the temperature at which the exothermic reaction may be initiated and it further serves to maintain and control a steady ignition of the composition. Aluminium fluoride is the fluoride of choice as its use assists in obtaining a high alumina content in the final refractory.

The relative proportions of the ingredients of the mixture may be varied to suit the conditions and the required alumina content of the final product. For a given desired alumina content, the amount of aluminum will be greater as the alumina content of the clay is lower and vice versa.

A suitable composition may consist, for example, of the following in parts by weight:

| | Parts |
|---|---|
| Aluminous clay (50% alumina content) | 40–60 |
| Aluminum powder | 10–30 |
| Oxidizing agent (nitrate or chlorate) | 2–20 |
| Fluoride | 2– 6 |

It will be understood that the compositions containing aluminous clay and their manner of use are to be distinguished from the so-called exothermic compositions which have been used in the past for generating heat in a hot top or in the head of a mould. Such compositions have included aluminum, oxidizing agents, fillers and optionally a fluoride. However, they have been so formulated as to generate a very substantial amount of heat, far in excess of that sufficient merely to fire the composition, and the mixture obtained after firing has not been a compact mass but a highly porous material with poor volume stability when subjected to temperature changes.

By means of the present invention it is possible to obtain alumina-based refractories of very high alumina content, e.g. 90% or even more. Furthermore, the method presents important advantages in that no separate treatment in furnace or kiln is necessary, since it is merely necessary to effect a partial drying of the composition and to initiate the ignition of the composition, for example, by means of blow-torch or priming plug of sensitive exothermic material, and the whole composition then fires and fully dries out. Moreover, the firing is rapid and even throughout the composition. Furthermore, no great heat needs to be applied, the compositions firing at quite a low temperature, and there is no need for a continuous supply of heat.

It arises from these advantages that it is possible to fabricate high-alumina refractory blocks or shapes as and when required, all delay due to the previous necessity for a kilning or like operation being avoided.

The following example will serve to illustrate the invention:

*Example*

The following compositions were prepared:

| | Percent by weight |
|---|---|
| Finely divided aluminum | 25 |
| Aluminum fluoride | 4 |
| Barium nitrate | 10 |
| Haematite ($Fe_2O_3$) | 5 |
| Gum arabic | 3 |
| Aluminous clay— (A) chamotte, (B) sillimanite | 53 | i.e. all the ingredients were the same in the two compositions except that one (A) contained chamotte and the other (B) contained sillimanite. The sieve grinding of the aluminous clay was approximately 45% of 10–20 mesh, 10% of 20–60 mesh and 45% minus 60 mesh.

The composition was moulded to the shape of a block, partially dried out and then fired.

The refractory A, using chamotte, had a cold crushing strength of about 950 p.s.i. and an approximate porosity of 50%. The refractory B, using sillimanite, had a cold crushing strength of about 650 p.s.i. and an approximate porosity of 37%.

Advantageously, self-fired refractory made according to the invention may be provided with a surface coating of a slurry of finely divided refractory in order still further to reduce the surface porosity of the products.

We claim as our invention:

1. A process for the production of a refractory material which comprises forming an admixture of a refractory selected from the group consisting of alumina and aluminous clay, said refractory being of such particle size that it will pack to a condition of low porosity, at least 10% by weight of the admixture of aluminum in a state of subdivision such that it will pass a 60 mesh and a substantial proportion of it will pass a 200 mesh, and an oxidizing agent for the aluminum selected for the group consisting of nitrates and chlorates which yield, on heating, high melting metal oxides, said oxidizing agent being present in a quantity substantially less than the amount stoichiometrically necessary to oxidize all the aluminum, the said admixture containing 0% to 5% by weight of an oxide selected from the class consisting of manganese dioxide and iron oxide, bonding the said admixture with the minimum amount of bonding agent sufficient to impart shape-retaining properties to the shaped admixture, and subjecting said bonded mixture to a temperature at which reaction between the aluminum and the oxidizing agent is initiated and thereafter proceeds exothermically, the character and quantity of the aluminum and oxidizing agents being such as to cause the mixture to increase in temperature to at least 1400° C.

2. A process according to claim 1 wherein the refractory is an aluminous clay of $Al_2O_3$ content at least 50% by weight.

3. A process according to claim 1 wherein the refractory has a particle size distribution in which about 45% will pass a 5 mesh but be retained on a 30 mesh, about 10% will pass a 30 mesh but be retained on an 80 mesh and about 45% will pass an 80 mesh.

4. A process according to claim 1 wherein the admixture contains a small proportion of a fluoride.

5. A composition which consists essentially of an admixture of a refractory selected from the group consisting of alumina and aluminous clay, the refractory being of such particle size that it will pack to a condition of low porosity, at least 10% by weight of the admixture of aluminum in a state of subdivision such that it will pass a 60 mesh and a substantial proportion of it will pass a 200 mesh, and an oxidizing agent for the aluminum selected from the group consisting of metal nitrates and chlorates which yield, on heating, high melting metal oxides, said oxidizing agent being present in a quantity substantially less than the amount stoichiometrically necessary to oxidize all the aluminum, the said admixture containing 0% to 5% by weight of an oxide selected from the class consisting of manganese dioxide and iron oxide, and the said admixture being bonded with the minimum amount of bonding agent sufficient to impart shape-retaining properties to the shaped admixture, the character and quantity of the aluminum and oxidizing agents being such as to cause the mixture to increase in temperature to at least 1400° C. when fired.

6. A composition according to claim 5 wherein the refractory is an aluminous clay of $Al_2O_3$ content, at least 50% by weight.

7. A composition according to claim 5 wherein the refractory has a particle size distribution in which about 45% will pass a 5 mesh but be retained on a 30 mesh, about 10% will pass a 30 mesh but be retained on an 80 mesh and about 45% will pass an 80 mesh.

8. A composition according to claim 5 which further contains a small proportion of a fluoride.

References Cited in the file of this patent

UNITED STATES PATENTS

| 2,741,822 | Udy | Apr. 17, 1956 |
| 2,798,818 | Pletsch et al. | July 9, 1957 |